(12) United States Patent
Serov et al.

(10) Patent No.: US 10,522,843 B1
(45) Date of Patent: *Dec. 31, 2019

(54) SUPPORTED NI-M MATERIALS FOR ELECTROOXIDATION OF HYDRAZINE

(71) Applicants: Alexey Serov, Albuquerque, NM (US); Plamen B Atanassov, Santa Fe, NM (US); Tomokazu Sakamoto, Moriyama (JP); Hirohisa Tanaka, Kawabe (JP); Koichiro Asazawa, Moriyama (JP)

(72) Inventors: Alexey Serov, Albuquerque, NM (US); Plamen B Atanassov, Santa Fe, NM (US); Tomokazu Sakamoto, Moriyama (JP); Hirohisa Tanaka, Kawabe (JP); Koichiro Asazawa, Moriyama (JP)

(73) Assignee: STC. UNM, Albuquerque, NM (US)

( * ) Notice: Subject to any disclaimer, the term of this patent is extended or adjusted under 35 U.S.C. 154(b) by 335 days.

This patent is subject to a terminal disclaimer.

(21) Appl. No.: 15/423,763

(22) Filed: Feb. 3, 2017

Related U.S. Application Data

(62) Division of application No. 14/525,928, filed on Oct. 28, 2014, now Pat. No. 9,601,784.

(60) Provisional application No. 61/896,471, filed on Oct. 28, 2013.

(51) Int. Cl.
*H01M 4/90* (2006.01)
*H01M 8/22* (2006.01)

(52) U.S. Cl.
CPC ....... *H01M 4/9041* (2013.01); *H01M 4/9083* (2013.01); *H01M 8/222* (2013.01); *H01M 2250/20* (2013.01)

(58) Field of Classification Search
CPC ............................ H01M 4/9041; H01M 8/222
See application file for complete search history.

*Primary Examiner* — Carlos Barcena
(74) *Attorney, Agent, or Firm* — Ellen M. Gonzales; Gonzales Patent Services

(57) ABSTRACT

A supported bi-metallic non-platinum catalyst that is capable of oxidizing hydrazine to produce, as by-products of energy production, nitrogen, water, and zero or near-zero levels of ammonia is described. The catalyst is suitable for use in fuel cells, particularly those that utilizes an anion-exchange membrane and a liquid fuel such as hydrazine.

9 Claims, 6 Drawing Sheets

SUPPORTED NI-M MATERIALS FOR ELECTROOXIDATION OF HYDRAZINE

CROSS-REFERENCE TO RELATED APPLICATIONS

The following application claims benefit of U.S. Provisional Application No. 61/896,471, filed Oct. 28, 2013, which is hereby incorporated by reference in its entirety.

BACKGROUND

Fuel cells are receiving increasing attention as a viable energy-alternative. In general, fuel cells convert electrochemical energy into electrical energy in an environmentally clean and efficient manner. Fuel cells are contemplated as potential energy sources for everything from small electronics to cars and homes. In order to meet different energy requirements, there are a number of different types of fuel cells in existence today, each with varying chemistries, requirements, and uses.

As a specific example of fuel cell utility, the automotive world will be changed in 2015, when leading manufacturers will publicly introduce their first generation of commercial fuel cell vehicles. It should be noticed, however, that these automobiles were developed with Proton Exchange Membrane (PEM) technology and the Membrane Electrode Assemblies in fuel stacks containing platinum catalysts for both hydrogen oxidation and oxygen reduction.

There are several drawbacks of PEM based technology including: the high cost of the fuel cell membranes, the extremely high cost of platinum, and the absence of a developed hydrogen infrastructure. Further, the use of hydrogen requires a high-pressure tank, which requires a full re-design of the automobile frame. These factors result in a high cost commercial vehicle with a low driving range and safety issues.

Accordingly, there is a great need for the development of fuel cells that alternate fuel cell designs that address at least some, if not all of these drawbacks.

SUMMARY

According to various embodiments the present disclosure provides a fuel cell suitable for use in automobiles and other industries/applications that utilizes an anion-exchange membrane and a liquid fuel such as hydrazine with a supported bi-metallic non-platinum catalyst to produce energy with limited to no ammonia generation.

According to yet another embodiment, the present disclosure provides a method for oxidizing hydrazine without producing undesirable amounts of ammonia that includes exposing the hydrazine to a supported bi-metallic non-platinum catalyst.

According to yet another embodiment, the present disclosure provides a supported bi-metallic non-platinum catalyst that is capable of oxidizing hydrazine to produce, as by-products of energy production, nitrogen, water, and zero or near-zero levels of ammonia.

According to a still further embodiment, the present disclosure provides methods for synthesizing a supported bi-metallic non-platinum catalyst.

DETAILED DESCRIPTION

According to various embodiments the present disclosure provides a fuel cell suitable for use in automobiles and other industries/applications that utilizes an anion-exchange membrane and a liquid fuel such as hydrazine with a supported bi-metallic non-platinum catalyst. In contrast to PEM hydrogen fuel cells, the present disclosure presents anion-exchange membrane fuel cells (AEMFCs) with liquid fuels. Switching from the acidic proton exchange system to the use of alkaline anion-exchange membranes has many benefits including, but not limited to, fast kinetics towards fuel oxidation and oxygen reduction, and, as described in greater detail herein, the use of less costly non-platinum group metal catalysts as anode and cathode materials for both sides of the MEA. To meet the power output requirements of a stack with limited size, the anode material should provide the highest power density, be stable, and be selective toward the production of water and nitrogen with no or limited ammonia ($NH_3$) generation. Up to now, previously reported catalysts have demonstrated unsatisfactory activity when used under real operating conditions (i.e. in open air).

Figure 1:
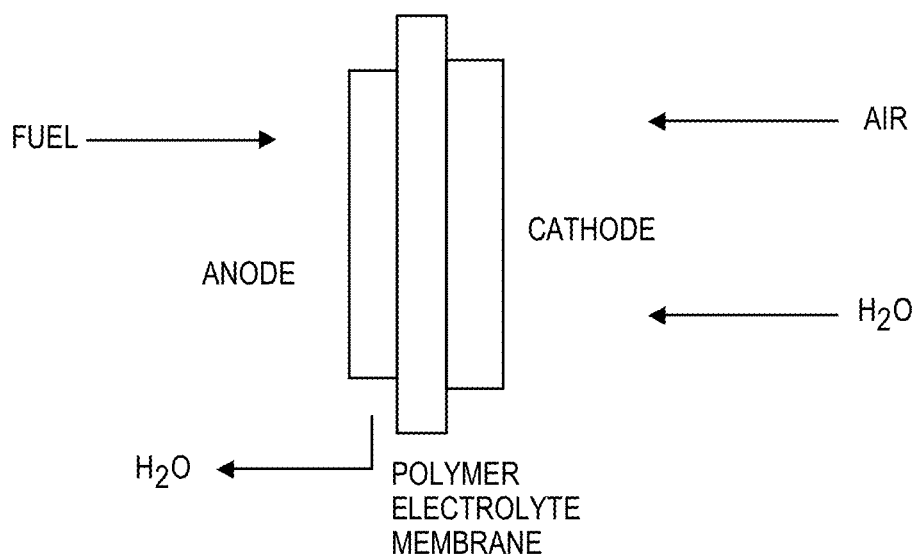
FIG. 1 is a schematic illustration of an anion-exchange membrane fuel cell (AEMFC).

According to an embodiment, the liquid-fed fuel cell is an alkaline anion exchange membrane fuel cell (AAEMFC) as shown in FIG. 1. In an AAEMFC, the fuel is supplied to the anode and oxygen (typically as air) and water are supplied to the cathode. Catalysts enable oxidation of the fuel at the anode and reduction of oxygen at the cathode. Oxygen reduction produces hydroxide ions (OH—) which migrate through a polymer electrolyte membrane towards the anode. At the anode, the hydroxide ions react with the fuel to produce water as a by-product and electrons, which travel through a circuit to produce current.

Figure 2:
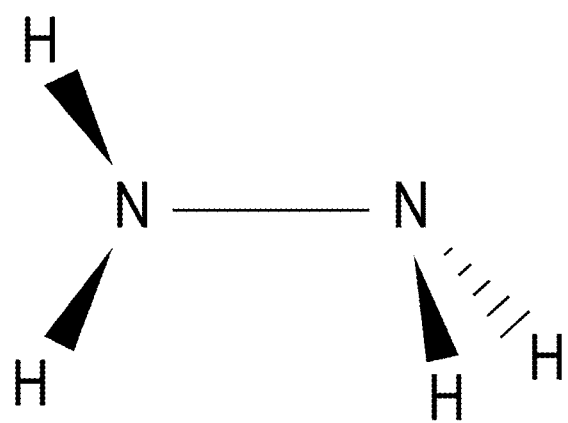
FIG. 2 is a chemical diagram of hydrazine.

As stated above, AEMFCs typically utilize liquid fuels and hydrazine hydrate (also referred to herein as "hydrazine" or "HH") is often a fuel of choice because it has no carbon atoms and thus will not contribute to increased $CO_2$ levels. Furthermore, the theoretical electromotive force of hydrazine is 1.56V and it can be oxidized by a number of non-platinum catalysts. A schematic illustration of hydrazine is shown in FIG. 2. As can be seen, hydrazine has the chemical formula $H_2NNH_2$ and thus easily produces ammonia molecules by breaking of the N—N bond. Accordingly, while hydrazine has appeared to be a promising fuel for automotive and other applications for the reasons identified above, previously described catalytic reactions that used hydrazine have produced ammonia as an undesirable by-product. However, the present disclosure provides a catalyst that is selective for hydrazine and which does not break the N—N bond during catalysis. Accordingly, in various embodiments, the present disclosure provides a hydrazine-fed fuel cell that produces, as by-products, nitrogen and water without or with negligible ammonia generation. For the purposes of the present disclosure, "negligible" ammonia is defined as ammonia being present at less than 10 ppm.

As stated above the present disclosure provides a catalyst that is selective for hydrazine and which does not break the N—N bond during catalysis. According to various embodiments, the catalyst is a bi-metallic, supported catalyst comprising a composite material formed from first and second metals dispersed on an electrically conductive support. According to various embodiments, the first metal is typically nickel, while the second metal can be any number of metals including, but not necessarily limited to refractory metals, 3D metals, or p-elements. Specific examples of suitable second metals include zinc, iron, cobalt, manganese, molybdenum, chromium, bismuth, tin, antimony, copper, indium, titanium, gold, platinum, palladium etc. The electrically conductive support can be carbon, conductive indium titanium oxide, ruthenium oxide, ruthenium titanium oxide, molybdenum nitride and carbide, tungsten nitride and carbide. Suitable carbon supports include Ketjen Black powder (Akzo Nobel), and Vulcan XC72R, CNTs, graphene, amorphous and crystalline carbons, graphites.

As indicated above, according to various embodiments the present disclosure provides a method for producing the novel bi-metallic catalysts described above. The method utilizes a mechanosynthesis-based approach that enables the production of supported materials without the use of a solvent, allowing for the inclusion of hydrophobic materials (such as carbonaceous materials) in the synthesis method. According to various embodiments of the mechanosynthesis-based method, electrically conductive support particles are mixed with metal precursors under sufficient conditions to coat, deposit, impregnate, infuse, or similarly associate the metal precursors on or in the support particles, thereby producing or initiating the production of a composite material. For the sake of simplicity, unless otherwise specified, the term "coat" is used herein as a catchall phrase to refer to any type of physical association, whether or not the "coating" is complete or partial and whether exclusively external or both internal and external.

It will be appreciated that the present disclosure often makes reference to "metal precursors." It should be understood that such terminology is used to refer to a metal-containing compound wherein the metal is available for chemical synthesis. Examples of metal precursors include metal salts such as nitrates, chlorides, acetates, hydroxides etc. Accordingly, while the specific metal precursors used should be selected based on the intended final product, according to various embodiments, metal nitrates such as $Ni(NO_3)_2$, $Zn(NO_3)_2$, $Mo(NO_3)_2$, and $Fe(NO_3)_3$ are suitable metal precursors for the methods disclosed herein.

As an example, a composite material is produced by ball milling at least two different types of metal precursors and a support particle. The composite material is then reduced to form an alloy from the metal precursors. In some embodiments, the composite materials are thermally reduced, for example with hydrogen. It is cautioned that care should be taken to prevent self-ignition of pyrophoric materials, for example, once the materials are cooled to room temperature, oxygen may be introduced into the furnace to prevent self-ignition.

Ball-milling has been described previously in reference to metal-nitrogen-carbon catalyst material synthesis as a method for filling the pores of a carbon support with a pore-filler. However, in the methods described in the present disclosure, ball-milling is used to enable mechanosynthesis, alleviating the need for solvent-based preparation methods. In general, the presently described methods utilize the energy produced by ball-milling of the various precursor materials to drive a chemical reaction between the precursors. According to a more specific example, a composite material according to the present disclosure may be synthesized by ball milling the support and metal precursors under sufficient conditions to initiate a reaction between the various precursors, thereby forming (or initiating formation of) the composite material.

For the purposes of the present disclosure, the term "ball mill" is used to refer to any type of grinder or mill that uses a grinding media such as silica abrasive or edged parts such as burrs to grind materials into fine powders and/or introduce to the system enough energy to start a solid state chemical reaction that leads to the formation of a catalyst. In general, for the purposes of the present disclosure, the ball mill used should be capable of producing enough energy to initiate the desired chemical reaction or achieve the desired level of mixing.

According to some embodiments, the entire process is performed dry, by which is meant, without the presence of any added solvents. According to one embodiment of a solvent-free process, all initial materials (i.e. the metal precursors and electrically conductive support particles) are combined in a ball mill in powder form and the entire process is conducted without the addition of any liquids. For the purposes of the present disclosure, a powder is a dry, bulk solid composed of a large number of very fine particles that may flow freely when shaken or tilted. Because the method can be practiced without the presence of any solvents, the method enables the synthesis of materials formed from or including insoluble materials, such as carbon. Of course it will be appreciated that while the mechanosynthesis method does not require the addition of solvents, solvents may be used, if desired.

Once the composite material is produced as described above, the resulting dry powder can be ground to a desired particle size, if, or as, desired. As stated above, the resulting powder is then reduced.

According to some embodiments, reduction occurs by heat treatment. According to some embodiments, heat treatment may preferably be between 80° C. and 800° C. The experimental data below provides specific conditions for a variety of different catalysts.

Once formed, the catalytic composite material can be mixed with an ionomer such as Nafion (E.I. du Pont de Nemours and Company, Buffalo, N.Y.) to form an ink which can then be sprayed or otherwise deposited onto a surface, such as an electrolytic membrane. The catalytic composite material, and ionomer can be mixed together in any suitable or desired ratio, though specific examples are given below.

Specific examples and additional details related to this are described in the Examples section below.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims. As used herein and in the appended claims, the singular forms "a," "an," and "the" include plural reference unless the context clearly dictates otherwise. Thus, for example, a reference to "a membrane" may include a plurality (for example, a stack) of membranes.

Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications referenced below and/or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

REFERENCES

Example I—Ni—Zn/Kb Catalyst

Materials and Methods
NiZn/KB Synthesis

Figure 3:
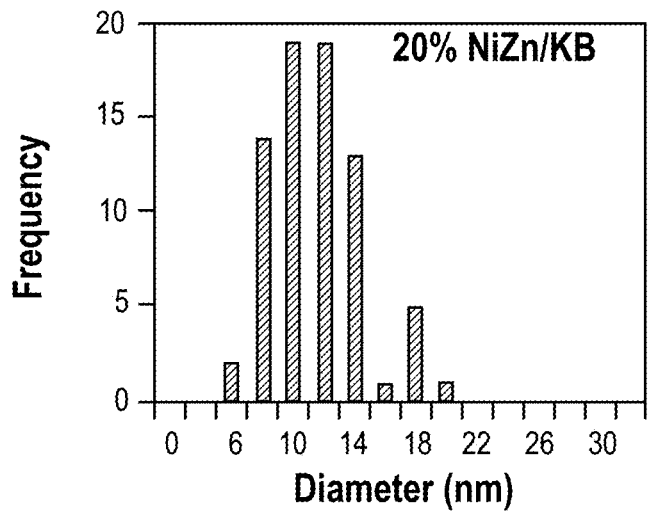
FIG. 3 shows particle size distribution for $Ni_{87}Zn_{13}$/KB catalysts at 20% loading.
Figure 4:
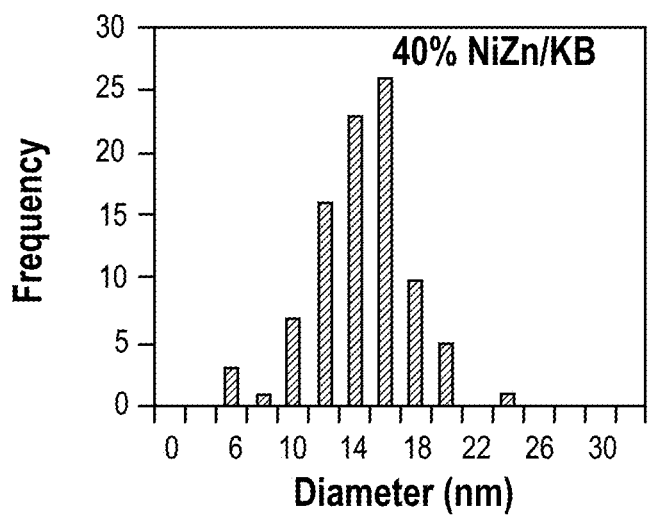
FIG. 4 shows particle size distribution for $Ni_{87}Zn_{13}$/KB catalysts at 40% loading.
Figure 5:
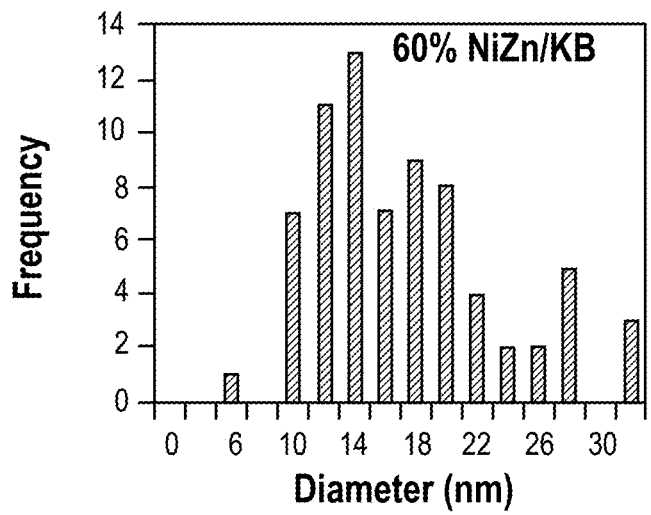
FIG. 5 shows particle size distribution for $Ni_{87}Zn_{13}$/KB catalysts at 60% loading.

Calculated amounts of nickel and zinc nitrates (Sigma Aldrich) in order to achieve $Ni_{87}Zn_{13}$ composition (and adjusted to different loadings) were placed in an agate ball-mill jar along with Ketjen Black (Akzo Nobel) powder. The mixture was ball-milled for 2.5 hours at 500 RPM. The well mixed material was then reduced in 7 at. % of $H_2$ gas (100 ccm flow rate) for 4 hours at T=450° C. in a tube furnace. After cooling down to room temperature, 1 at. % of $O_2$ was introduced into the furnace in order to prevent self-ignition of pyrophoric material. FIGS. 3-5 show the particle size distribution for $Ni_{87}Zn_{13}$/KB catalysts with different loading.

RDE Tests

Electrochemical analysis for synthesized catalysts was performed using the Pine Instrument Company electrochemical analysis system. The rotational speed reported was 1600 RPM, with a scan rate of 20 mV sec$^{-1}$. The electrolyte was 1 M KOH (ACS grade, EMD) saturated in $N_2$ at 60° C. A platinum wire counter electrode and a Hg/HgO reference (1 M KOH) with used.

Working electrodes were prepared by mixing 10 mg of the catalyst with 1.595 g Tetrahydrofuran (HPLC grade, Honeywell) with 315 mg anionic ionomer (2.0 wt. %, Tokuyama Corp.) The mixture was sonicated before 3 µL was applied onto a glassy carbon disk with a sectional area of 0.196 cm$^2$. The loading of catalyst on the electrode was 76.5 µg cm$^2$.

MEA Fabrication and Tests

Catalyst Ink Preparation 100 mg of the catalyst was combined with 0.96 ml of isopropanol, 0.24 ml of Tetrahydrofuran and 0.2 ml of a 2 wt. % anionic ionomer solution (Tokuyama Corp.). The ink was then sonicated for 5 min. After sonication, $ZrO_2$ beads (Diameter=2.0 mm, Nikkato) were added and the mixture was agitated for 15 min.

Catalyst Coated Membrane (CCM) Preparation

The ink described above was directly sprayed onto an anionic electrolyte membrane (A201, Tokuyama Corp.) to form the catalyst electrode on the membrane. The membrane was then pressed for 5 min at room temperature to bind the catalyst layers to the membrane. SEM, XRD and FTIR Characterization Scanning electron microscopy was performed on a Hitachi S-800 instrument.

Powder X-ray diffraction analysis was performed using a Rigaku Smartlab diffractometer with Brag-Brentano focusing geometry. The X-ray source used was a Cu anode operating at 40 kV and 40 mA. The detector used was the Rigaku D/teX Ultra 250 1D silicon strip detector with a K-β incident beam monochromoter.

Whole pattern fitting (WPF) using MDI JADE 2010™ analytical software was performed to determine relative phase composition and crystallite domain size. A background model using a 17th order polynomial curve fit with inverse 1st and 2nd order terms to accommodate for increased background at low angles was used.

Refined scale factors were applied to the integrated intensities of the fitted profiles allowing for the use of RIR vales for NiZn and ZnO (8.15 and 5.37 respectively) imported from the RDB-Linnus-Pauling database to relate peak area to relative composition (wt. %). Crystallite size was calculated by fitting the peak broadening of the refined pattern with an instrument calibration curve generated from a NIST LaB6 standard to correct for instrument broadening.

In-situ IRRAS were performed with a Nicolet 6700 FT-IR spectrometer equipped with a liquid nitrogen cooled Mercury Cadmium Telluride detector (MCT). A ZnSe hemisphere was the IR window, with an incident angle of 36°.

Spectra were collected and compared to a background reference spectrum, taken prior to initiating the linear scan, at −0.42 V vs. RHE. Details of interpretation are given elsewhere. The IRRAS experiment was performed simultaneously with linear voltammetry from −0.4 to 0.4 V vs. RHE at a scan rate of 1 mV sec$^{-1}$. Electrochemical conditions were: 1 M KOH (ACS grade, EDM), 100 mM HH (35 wt. % in H$_2$O, Sigma-Aldrich), Ar gas purge, platinum counter-electrode, Ag/AgCl (sat.) reference electrode, at room temperature with no rotation. Working electrodes were prepared by mixing 10 mg of the catalyst with 1.595 g Tetrahydrofuran (HPLC grade, Honeywell) with 315 mg anionic ionomer (2.0 wt. %, Tokuyama Corp.) The mixture was sonicated before 3 μL was applied onto a glassy carbon disk with a diameter of 5 mm, for a loading of 76.5 μg cm$^{-2}$.

Results/Discussion

Herein we report the synthesis of novel Ni-based supported catalysts by a completely solvent-free method. The method is based on a mechanochemical approach and is scalable to hundreds of kilograms of catalyst and can be considered a "green" synthesis method, compared with conventional synthesis, which requires the use of solvents. These catalysts show high activity in both RDE and MEA tests, with real vehicles operation conditions operational conditions. The effects of catalysts loading and the effect of carbon addition towards of hydrazine electrooxidation were studied on nickel-based materials for the first time.

Figure 6:
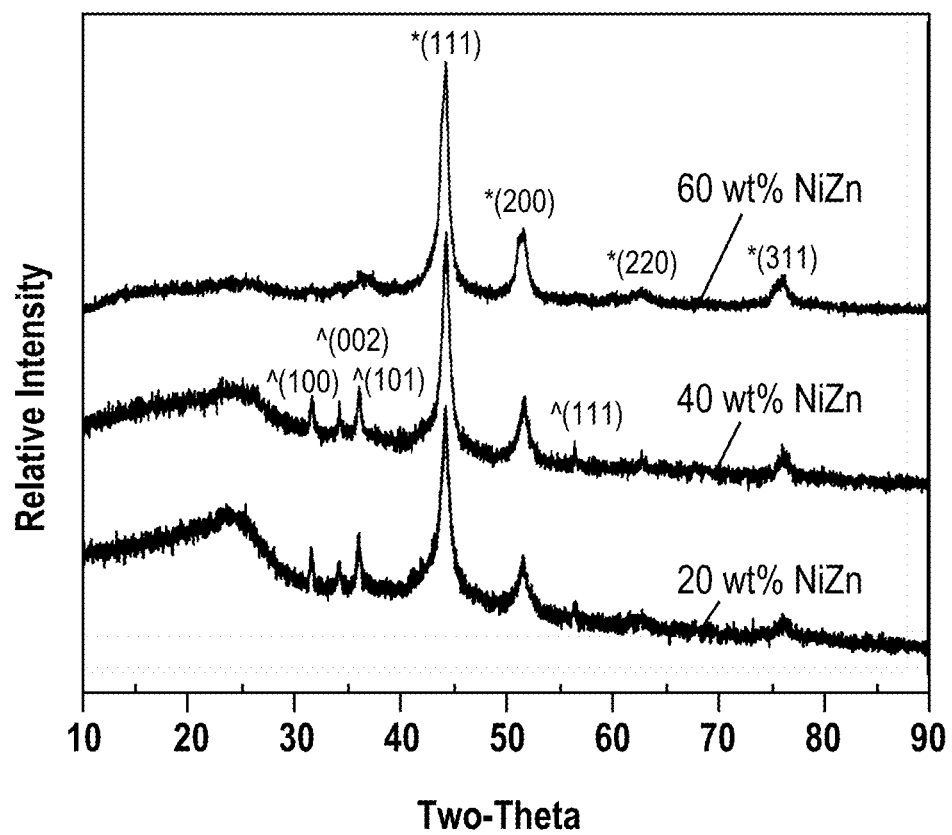
FIG. 6 is a graph showing XRD data for NiZn catalysts with different loading synthesized by mechanochemical method.

These electrocatalysts for hydrazine electrooxidation were synthesized by solvent-free impregnation of nickel and zinc precursors with high-energy mechanochemical approach. Synthesized materials were comprehensively characterized by BET, SEM, TEM, XRD, and their electrochemical activity was measured by RDE and fuel cell tests X-Ray diffraction patterns for the NiZn catalysts are shown on FIG. 6. Analysis revealed that all three catalysts consist of mainly Ni$_{87}$Zn$_{13}$ phase (abbreviated as NiZn in the manuscript). A minor phase, identified as ZnO, was detected in the NiZn catalysts, resulting in various NiZn:ZnO ratios in the overall bulk composition: 85:15, 85:15, and 95:5 (20 wt. %, 40 wt. % and 60 wt. %, respectively). The presence of zinc oxide in the catalysts can be explained by extremely high oxophilicity of Zn-metal. We observed that even controlled passivation of the reduced samples could not prevent oxide formation upon air exposure. However, operation of the catalysts in the highly reductive environment of 20 wt % of hydrazine hydrate (HH) will lead to ZnO reduction. MEAs post-mortem analysis is required in order to confirm this hypothesis. Particle grain size calculated by Scherrer analysis of the refined patterns gave an average particle domain size for all catalyst in the range of 10 nm, which was confirmed by particle size distribution from TEM, images (FIGS. 3-5).

Figure 7:
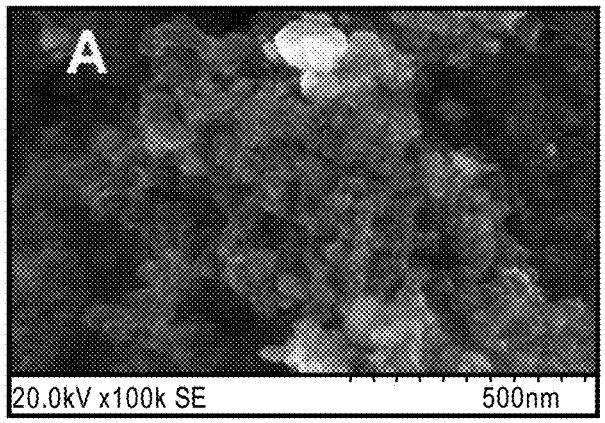
FIG. 7 is a SEM image of $Ni_{87}Zn_{13}$/KB prepared by ball-mill method with 20 wt %.
Figure 10:
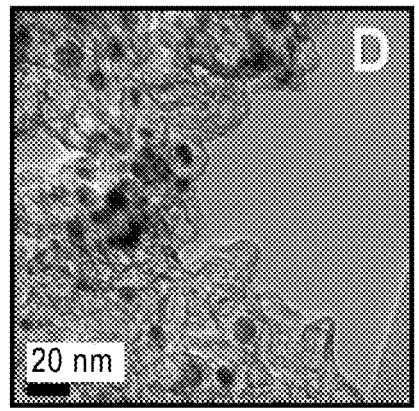
FIG. 10 is a TEM image of $Ni_{87}Zn_{13}$/KB prepared by ball-mill method with 20 wt %.
Figure 8:
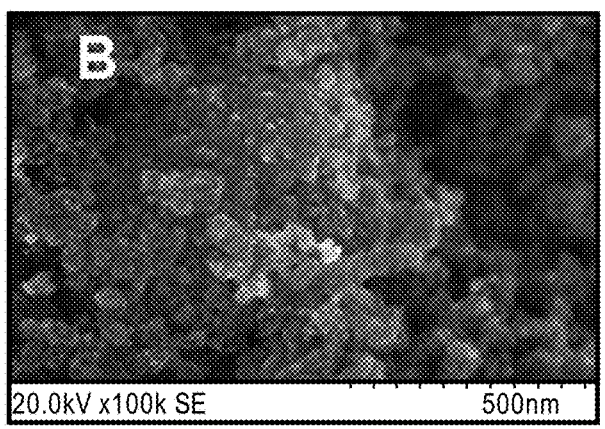
FIG. 8 is a SEM image of $Ni_{87}Zn_{13}$/KB prepared by ball-mill method with 40 wt %.
Figure 11:
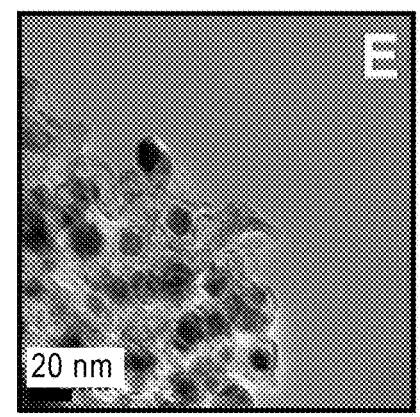
FIG. 11 is a TEM image of $Ni_{87}Zn_{13}$/KB prepared by ball-mill method with 40 wt %.
Figure 9:
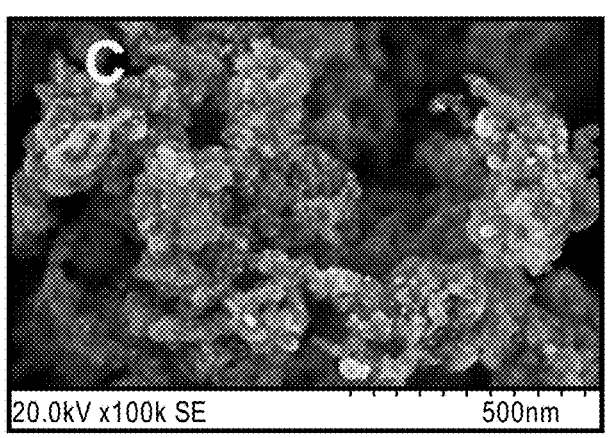
FIG. 9 is a SEM image of $Ni_{87}Zn_{13}$/KB prepared by ball-mill method with 60 wt %.
Figure 12:
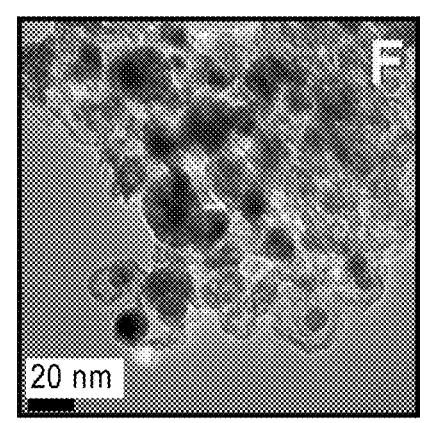
FIG. 12 is a TEM image of $Ni_{87}Zn_{13}$/KB prepared by ball-mill method with 60 wt %.

Morphological analysis by SEM and particles distribution on support by TEM is shown on FIGS. 7-9 and FIGS. 10-12, respectively. SEM images revealed that catalysts preserved morphology typical for materials synthesized on high surface area Ketjen Black carbons (FIGS. 7-9). From TEM images it observed that catalysts with 40 wt. % and 60 wt. % are evenly coated support surface without significant agglomeration. In the case of low loaded material with 20 wt. % of NiZn surface was not fully covered, due to high carbon to catalyst ratio (FIGS. 10-12). However, it also was confirmed that catalyst is not agglomerated (FIG. 11).

Figure 13:
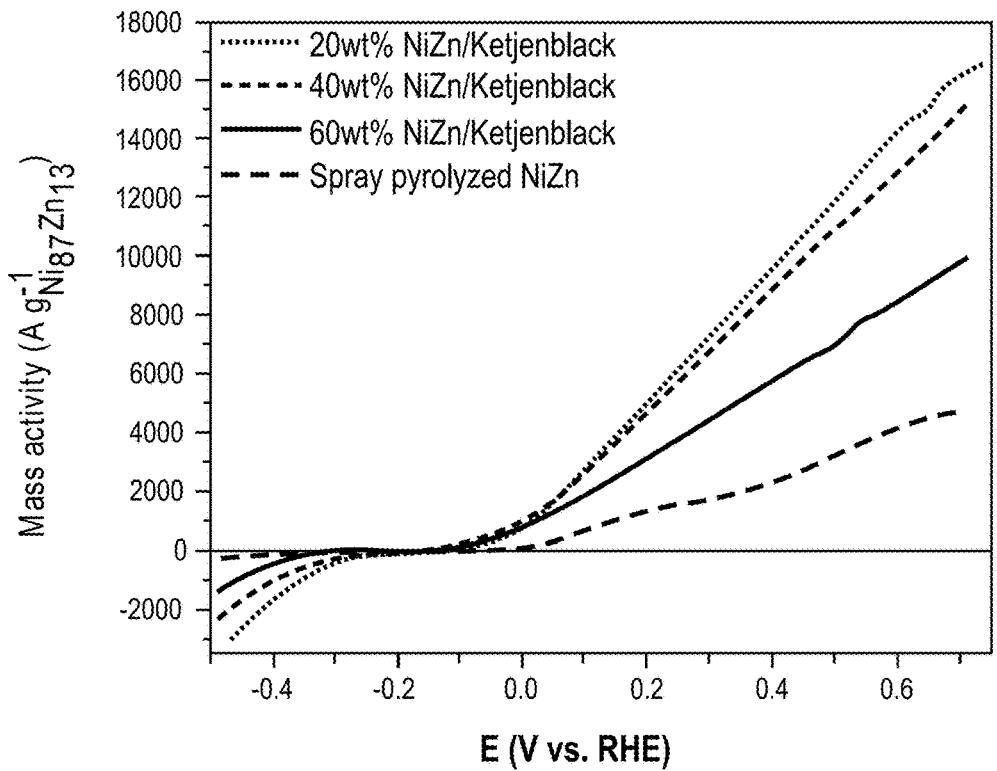
FIG. 13 is a cyclic voltammogram of NiZn catalysts with different metal loading compared with unsupported spray pyrolyzed NiZn. Conditions: catalyst total loading 20 µg, 1 M KOH, 5 wt. % Hydrazine hydrate, 60° C., $N_2$ purge, 1600 RPM.

FIG. 13 compared the electrochemical performance of the supported catalysts with spray pyrolyzed nickel-based unsupported materials. It can be seen from the data in FIG. 13 that the supported catalysts possess higher overall mass activity and improved onset potential (ca. −0.14 V vs. RHE) compared to unsupported NiZn. Considering that the particle size for unsupported NiZn was in the range of 20-60 nm, the higher electrochemical activity for NiZn/KB catalysts is a direct confirmation of PSD effect. It was found that the 20 wt. % and 40 wt. % NiZn/KB catalysts have similar onset potentials and a peak activity of ca. 16000 A g$_{NiZn}^{-1}$, the highest mass activity of electrocatalysts for HH oxidation published in open literature to our knowledge.

Figure 14:
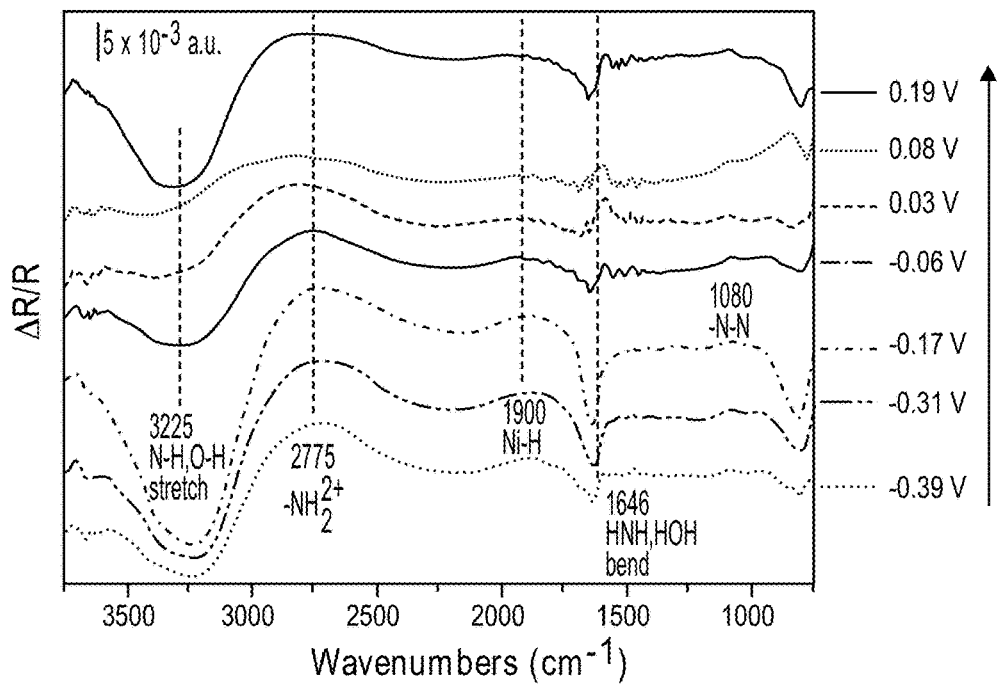
FIG. 14 is an in-situ IRRAS with simultaneous linear voltammetry. 60 wt. % NiZn, 1 M KOH+5 wt. % HH, room temperature, no rotation, 76.5 µg $cm^{-2}$ catalyst, 1 mV $sec^{-1}$, V vs. RHE.

The mechanism of HH oxidation on unsupported catalysts was previously hypothesized from in-situ infrared adsorption spectroscopy (IRRAS) experiments. (See e.g., Martinez, U., Asazawa, K., Halevi, B., Falase, A., Kiefer, B., Serov, A., Padilla, M., Olson, T., Datye, A., Tanaka, H., Atanassov, P. Phys. Chem. Chem. Phys., 2012, 14, 5512-5517.) These same experiments were performed with supported catalysts to confirm that the observed mechanism was not visibly altered by the inclusion of carbon and a different synthesis method. FIG. 14 shows the appearance and disappearance of species critical to the previous reaction mechanism, notably decreased signal from N—H/O—H (3225 cm$^{-1}$) indicating species consumption and increased signals from —NH$_2^+$+(2775 cm$^{-1}$), Ni—H (1900 cm$^{-1}$) and HNH/HOH (1646 cm$^{-1}$) indicating the presence of intermediate oxidation species. The presence of N—N (1080 cm$^{-1}$), which is characteristic of HH, is also noted. These same trends (increasing/decreasing signals) were observed for unsupported catalysts, suggesting that the reaction pathway is preserved for supported catalysts synthesized via mechanochemical methods.

Figure 15:
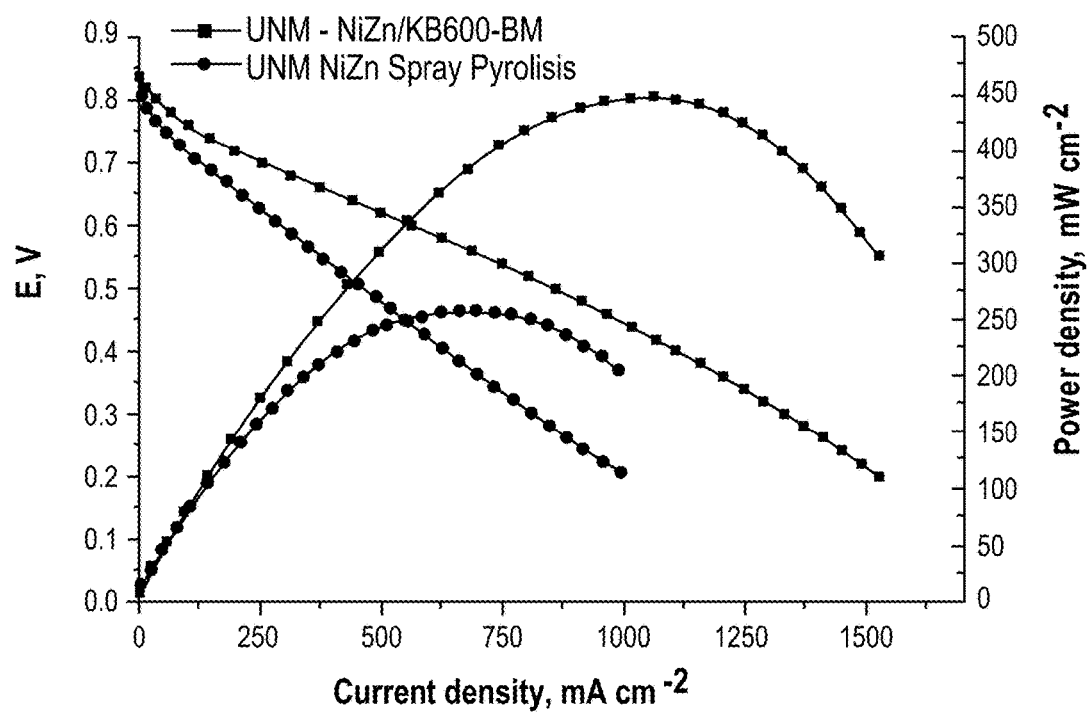
FIG. 15 MEA performance of different NiZn materials. Conditions: catalysts loading -2 mg $cm^{-2}$ (anode), 1 mg $cm^{-2}$ (cathode); $T_{cell}$=80° C., HH flow rate=2 ml $min^{-1}$ (20 wt. %), air flow rate=500 ccm.

To confirm the high activity of supported NiZn/KB catalysts, single cell MEA tests were performed with cathode materials—non-platinum group metal Fe-Aminoantipyrine derived catalyst. (Synthesis method described in references 1-11 identified in reference section below.) Despite the fact the in RDE experiments 20 wt. % NiZn/KB had a slightly higher peak activity from the point of view of MEA building the 60 wt. % catalyst was selected for fuel cell testing. The low density of 20 wt. % NiZn/KB results in significantly thicker catalyst layer with poorly developed triple-phase boundary. The comparison of activity with unsupported NiZn catalyst is shown on FIG. 15.

It is clear that a 2-fold increase of activity in peak current density can be achieved by using carbon supports. The higher performance of NiZn/KB vs. NiZn in RDE tests can be explained by particle size effect. However, in MEA tests the situation is more complex. Factors to consider include possible mass transfer limitations of HH to catalyst active sites, the removal of gases from the catalytic layer, and possible interactions between the ionomer and catalyst. It also should be taken into account that the unsupported catalyst has a surface area an order of magnitude less than NiZn/KB. The increase of surface area in case of supported materials leads to increase in retention time of HH with contact of catalysts active sites, results in increase of power density. It should be noted that peak current density for 60 wt. % NiZn/KB of 450 mW cm$^2$ is the highest ever reported, making this catalyst state-of-the-art.

References, which, like all references identified herein, are incorporated by reference:

[1] Serov, A.; Martinez, U.; Falase, A.; Atanassov, P. *Electrochem. Comm.* 2012, 22, 193-196.

[2] Pylypenko, S.; Mukherjee, S.; Olson, T. S.; Atanassov, P. *Electrochim. Acta.* 2008, 53, 7875-7883.

[3] Robson, M. H.; Serov, A.; Artyushkova, K.; Atanassov, P. *Electrochim. Acta,* 2013, 90, 656-665.

[4] Brocato, S.; Serov, A.; Atanassov, P. *Electrochim. Acta.* 2013, 87, 361-365.
[5] Serov, A.; Robson, M. H.; Artyushkova, K.; Atanassov, P. *Appl. Catal.* B. 2012, 127, 300-306.
[6] Serov, A.; Robson, M. H.; Smolnik, M.; Atanassov, P. *Electrochim. Acta.* 2012, 80, 213-218.
[7] Serov, A.; Robson, M. H.; Halevi, B.; Artyushkova, K.; Atanassov, P. *Electrochem. Comm.* 2012, 22, 53-56.
[8] Falase, A.; Main, M.; Garcia, K.; Serov, A.; Lau, C.; Atanassov, P. *Electrochim. Acta.* 2012, 66, 295-301.
[9] Serov, A.; Martinez U.; Atanassov, P. *Electrochem. Comm.* 2013, 34, 185-188.
[10] Serov, A.; Robson, M. H.; Smolnick, M.; Atanassov, P. *Electrochim. Acta.* 2013, 109, 433-439.
[11] Serov, A.; Aziznia, A.; Benhangi, P. H.; Artyushkova, K.; Atanassov, P.; Gyenge, E. *J. Mater. Chem.* A 2013, 1, 14384-14391.
[12] Serov, A.; Artyushkova, K.; Atanassov P. *Adv. Energy Materials* 2014, DOI: 10.1002/aenm.201301735

Synthesis of NiCu/KB:

Calculated amounts of nickel and copper nitrates (Sigma Aldrich) in order to achieve NisCu11 composition (and adjusted to different loadings) were placed in an agate ball-mill jar along with Ketjen Black (Akzo Nobel) powder. The mixture was ball-milled for 3.5 hours at 550 RPM. The well mixed material was then reduced in 7 at. % of $H_2$ gas (120 ccm flow rate) for 2 hours at T=400° C. in a tube furnace. After cooling down to room temperature, 1 at. % of $O_2$ was introduced into the furnace in order to prevent self-ignition of pyrophoric material.

Synthesis of NiCo/KB:

Calculated amounts of nickel and cobalt nitrates (Sigma Aldrich) in order to achieve NiCo composition (and adjusted to different loadings) were placed in an agate ball-mill jar along with Vulcan XC72R powder. The mixture was ball-milled for 7 hours at 250 RPM. The well mixed material was then reduced in 7 at. % of $H_2$ gas (120 ccm flow rate) for 8 hours at T=700° C. in a tube furnace. After cooling down to room temperature, 1 at. % of $O_2$ was introduced into the furnace in order to prevent self-ignition of pyrophoric material.

Synthesis of NiBi/KB:

Calculated amounts of nickel and bismuth nitrates (Sigma Aldrich) in order to achieve $Ni_3Bi$ composition (and adjusted to different loadings) were placed in an agate ball-mill jar along with Vulcan XC72R powder. The mixture was ball-milled for 1 hour at 450 RPM. The well mixed material was then reduced in 7 at. % of $H_2$ gas (160 ccm flow rate) for 5 hours at T=350° C. in a tube furnace. After cooling down to room temperature, 1 at. % of $O_2$ was introduced into the furnace in order to prevent self-ignition of pyrophoric material.

Synthesis of NiIn/KB:

Calculated amounts of nickel and indium chlorides (Sigma Aldrich) in order to achieve NiIn composition (and adjusted to different loadings) were placed in an agate ball-mill jar along with Vulcan XC72R powder. The mixture was ball-milled for 3 hours at 550 RPM. The well mixed material was then reduced in 7 at. % of $H_2$ gas (120 ccm flow rate) for 8 hours at T=650° C. in a tube furnace. After cooling down to room temperature, 1 at. % of $O_2$ was introduced into the furnace in order to prevent self-ignition of pyrophoric material.

Synthesis of NiCr/KB:

Calculated amounts of nickel and chromium nitrates (Sigma Aldrich) in order to achieve $NiCr_3$ composition (and adjusted to different loadings) were placed in an agate ball-mill jar along with Vulcan XC72R powder. The mixture was ball-milled for 2 hours at 350 RPM. The well mixed material was then reduced in 7 at. % of $H_2$ gas (200 ccm flow rate) for 4.5 hours at T=500° C. in a tube furnace. After cooling down to room temperature, 1 at. % of $O_2$ was introduced into the furnace in order to prevent self-ignition of pyrophoric material.

Synthesis of NiSn/KB:

Calculated amounts of nickel and tin nitrates (Sigma Aldrich) in order to achieve $Ni_3Sn_4$ composition (and adjusted to different loadings) were placed in an agate ball-mill jar along with Vulcan XC72R powder. The mixture was ball-milled for 2.5 hours at 400 RPM. The well mixed material was then reduced in 7 at. % of $H_2$ gas (250 ccm flow rate) for 6 hours at T=475° C. in a tube furnace. After cooling down to room temperature, 1 at. % of $O_2$ was introduced into the furnace in order to prevent self-ignition of pyrophoric material.

What is claimed is:

1. A method for oxidizing hydrazine while producing ammonia at an amount of no more than 10 ppm comprising exposing the hydrazine to a catalyst comprising nickel, a second metal, and an electrically conductive supporting material, wherein the catalyst was formed by a mechanosynthesis-based method.

2. The method of claim 1 wherein the electrically conductive supporting material comprises carbon.

3. The method of claim 1 wherein the second metal is selected from the group consisting of Zn, Cu, Co, Bi, In, Cr and Sn.

4. The method of claim 1 wherein the second metal is zinc and the nickel and zinc portion of the catalyst has a chemical formula of $Ni_{87}Zn_{13}$.

5. The method of claim 1 wherein the mechanosynthesis-based method comprises ball-milling the electrically conductive support, and precursors of nickel and the second metal to form a composite material.

6. The method of claim 5 wherein the second metal is selected from the group consisting of Zn, Cu, Co, Bi, In, Cr and Sn.

7. The method of claim 1 wherein the nickel and the second metal are loaded on the electrically conductive support at a loading of at least 20%.

8. The method of claim 7 wherein the second metal is selected from the group consisting of Zn, Cu, Co, Bi, In, Cr and Sn.

9. The method of claim 8 wherein the second metal is zinc and the nickel and zinc have a chemical formula of $Ni_{87}Zn_{13}$.

* * * * *